Figure 1:
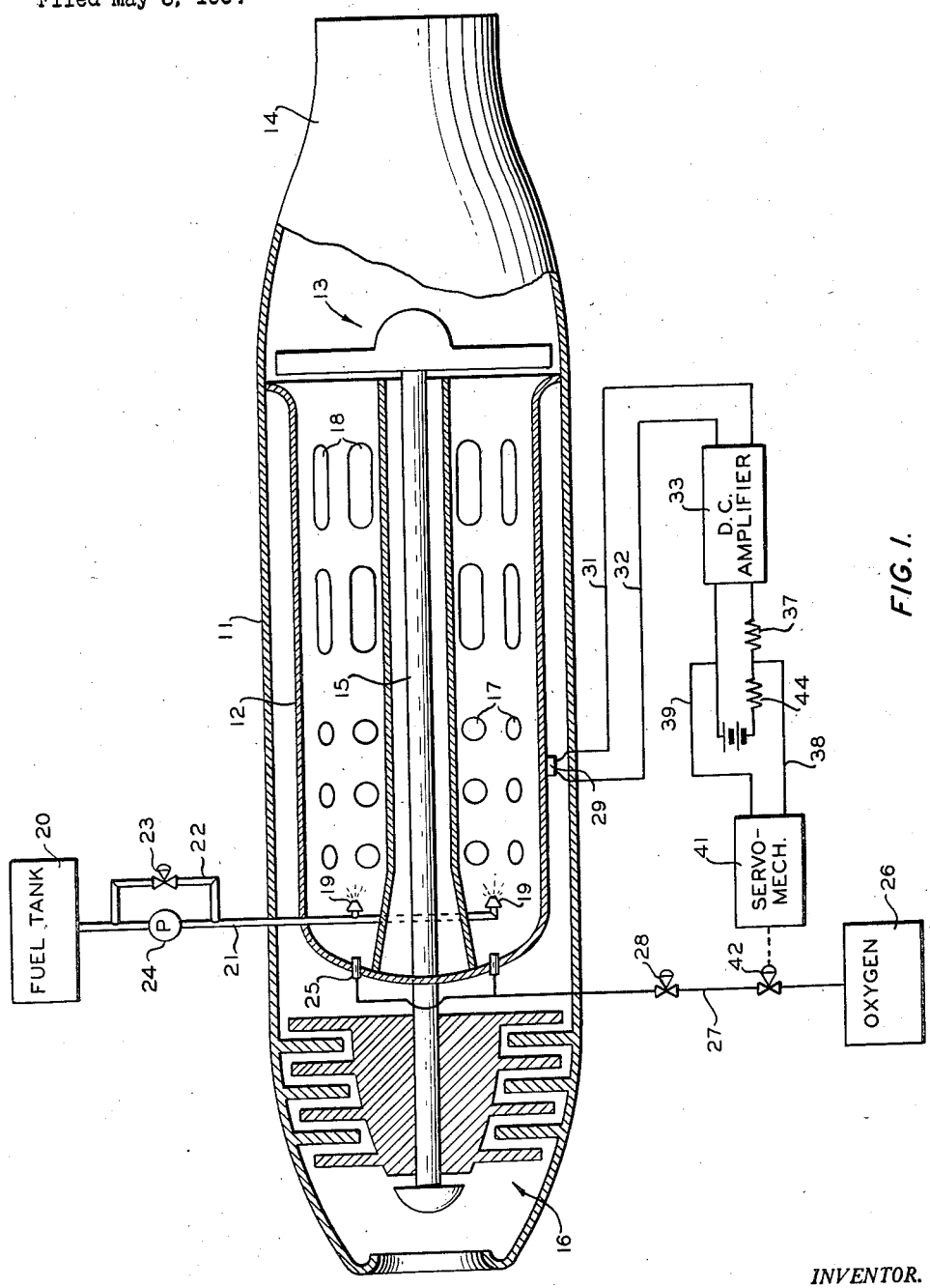

INVENTOR.
G. D. KITTREDGE
BY Hudson and Young
ATTORNEYS

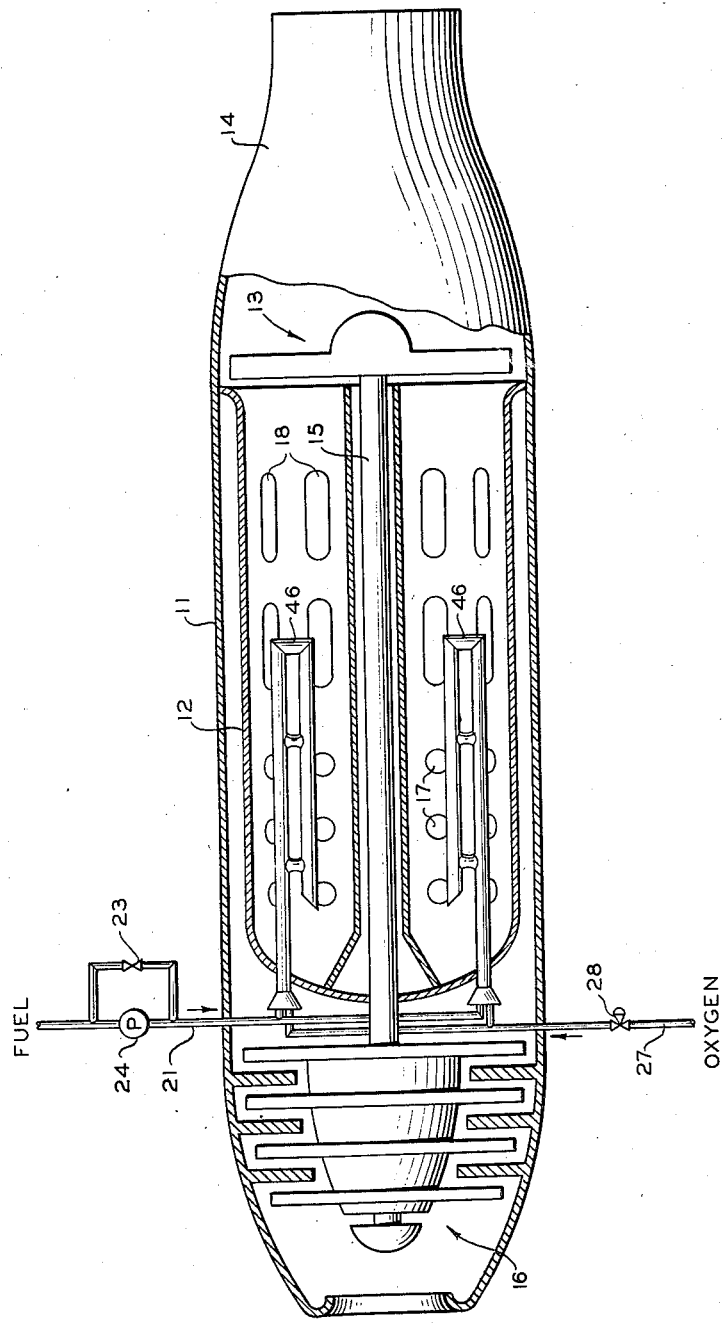

United States Patent Office 2,890,569
Patented June 16, 1959

2,890,569

REMOVAL OF CARBON DEPOSITS IN JET ENGINES

George D. Kittredge, Bartlesville, Okla., assignor to Phillips Petroleum Company, a corporation of Delaware Application May 3, 1954, Serial No. 427,222

1 Claim. (Cl. 60—39.09)

This invention relates to jet engines. In one of its more specific aspects, it relates to a method of operating jet engines on a fuel of high carbon deposition tendency. In another of its more specific aspects, it relates to a method for removing carbon deposits which form in the combustion chambers of jet engines. In still another of its more specific aspects, it relates to a method of operating continuous combustion power plants without an excessive deposition of carbonaceous materials in the combustion chambers thereof.

In the last few years jet engines have been used in increasingly larger numbers for the purpose of propelling aircraft. While originally jet engines were used principally in military aircraft of the fighter type, long range bombers and in some cases civilian transport planes are presently being equipped with this type of engine. With the increase in use of jet engines, a number of operational problems have also come to be recognized.

Jet engines, which may be generally classified as aerodynamic power plants, falls specifically into three distinct categories, i.e. ram jets, turbojets, and pulse jets. These jet engines have one fundamental feature in common, i.e., the mechanism by which thrust is produced. All jet engines take air from the atmosphere, add heat by some device, and then expel the air rearwardly at a velocity greater than that of the air being taken into the motor, thereby producing forward thrust. One distinct difference in operation, however, is apparent in the compression step. Air is jammed into the combustion zone of the turbojet engine by a gas turbine driven compressor. Compression in a ramjet engine is provided by the ramming effect of the oncoming air. Compression in the pulse jet engine is obtained by the ramming effect of the oncoming air and by the intermittent explosion of fuel which causes the closure of valves upstream of the combustion zone to prevent the escape of gases through the upstream end of the engine.

The fuel injected into the combustion zone of the jet engine may originally be ignited therein by a spark producing device, such as a conventional spark plug mounted in the wall of the combustion chamber. Additional fuel is thereafter ignited by the flame of burning fuel or by the heat from hot combustion gases remaining in the combustion zone or by the hot walls of the combustion chamber. The air and combustion gases within the combustion zones are heated by the heat of combustion and are exhausted from the combustion zone through a rearwardly extending exhaust nozzle at an exit velocity higher than the flying speed of the engine. The thrust produced thereby equals the gas mass flowing through the exaust nozzle times its absolute velocity in accordance with the law of momentum.

While jet engines may be operated on a wide variety of fuels, the particular fuel utilized will have a very definite effect upon engine performance. Because of the large amount of fuel consumed in the operation of jet engines, the cost and availability of supply are important factors to be considered when choosing a fuel. Typical jet fuels conventionally used in jet engine operation comprise a blend of hydrocarbons boiling in the approximate range of 100° F. to 700° F. For example a jet fuel may include from 10 to 30 percent kerosene, from 40 to 70 percent naphtha, and the remainder straight run gasoline. Other hydrocarbon fuels which may be used in jet engine operation are cat-cracked cycle stock and solvent extracts in the kerosene or gas oil boiling range. While such fuels are especially desirable from the standpoint of cost and availability of supply, such conventional fuels possess disadvantages from the standpoint of carbon forming tendencies.

It has been found that conventional jet fuels of high carbon deposition tendency when used in the operation of jet engines cause the formation of carbon deposits in the combustion chamber of the engine, particularly in the upstream end thereof where rich fuel-air mixtures are found. The deposition of carbonaceous materials in the combustion chamber has a deleterious effect on jet engines in general because formation of such materials results in hot spots forming on the surface of the combustion chamber, thereby promoting subsequent failure of that chamber. Furthermore, an excessive lay-down of carbon in the combustion chamber disturbs the air and fuel flow therein with the result that the combustion efficiency of the engine is materially reduced. Still again, damage to the jet engine may result from chunks or pieces of carbon breaking away from the surface of the combustion chamber. This latter problem is especially applicable to turbojet engine operation where the pieces of carbon may be blown into the blades of the high speed turbine. Special clean burning fuels have been suggested for use in jet engine operation in order to overcome the problem of carbon laydown. The use of such special fuels is, however, limited by their high cost and low availability of supply. In accordance with the present invention, jet engine operation on fuels of high carbon deposition tendency is made possible without excessive deposition of carbonaceous materials.

The following objects of the invention will be attained by the various aspects of the invention.

It is an object of the present invention to provide an improved method and means for operating jet engines.

Another object of the invention is to provide a method for removing carbon deposits which may form during operation in the combustion chambers of jet engines.

Still another object of the invention is to provide a method for operating continuous combustion power plants without excessive formation of carbonaceous materials.

Other and further objects and advantages will be apparent to those skilled in the art upon study of the accompanying disclosure.

Broadly speaking, the present invention resides in the periodic injection of an additional oxygen-containing gas into the combustion chamber of a jet engine at the specific localities therein where carbonaceous materials tend to deposit in order to effect oxidation and removal of such materials. In a preferred modification of the invention, the supply of oxygen-containing gas to the combustion chamber of the jet engine is controlled so as to prevent overheating of the chamber.

Better understanding of this invention will be attained by reference to the accompanying drawing, in which:

Figure 1 is a diagrammatic representation, partly in section, of a turbojet engine including the temperature control means of the invention, and Figure 2 is a diagrammatic representation, partly in section, of a turbojet engine having a prevaporizer type combustion chamber.

The turbojet engine illustrated in Figure 1 of the drawing comprises an elongated shell 11 open at its upstream inlet and downstream outlet ends so as to permit high velocity gases to flow therethrough. A flame tube 12, which encompasses the combustion chamber of the engine, is disposed in an intermediate portion of shell 11. Turbine 13 is provided downstream of flame tube 12, and the gases resulting from the burning of fuel in the combustion chamber are expanded through turbine 13 to the atmosphere through exhaust nozzle 14. Turbine 13 is operatively connected by shaft 15 to compressor 16 which is positioned upstream of flame tube 12. Compressor 16 aids in compressing the air supplied to the combustion chamber through primary air holes 17 in the upstream end portion of flame tube 12. Quench air holes 18 are provided in the downstream end portion of flame tube 12 in order to cool the combustion gases in the combustion chamber and thereby protect the blades of turbine 13 from excessively high temperatures. Nozzles 19 in the upstream end of flame tube 12 are connected to fuel tank 20 by means of fuel line 21 and provide means for introducing an atomized fuel into the combustion chamber. Throttle valve 23 in by-pass line 22, which is connected to the inlet and outlet sides of fuel pump 24, provides the necessary means for controlling the rate of flow of fuel to the combustion chamber. Nozzles 25, also disposed in the upstream end of flame tube 12, are connected to a source of oxygen 26 by means of line 27, thereby furnishing means for injecting the gas into the combustion chamber of the jet engine. Nozzles 25 may advantageously be venturi nozzles in order that the oxygen may be directed over a large area of the combustion chamber, thereby assuring contact between the carbon deposits and the oxygen. It is also within the scope of the invention to introduce the gas into the combustion chamber through tubes or through apertures in the wall of the flame tube. Valve 28 in line 27 provides means for controlling the rate of flow of oxygen to the combustion chamber. While the turbojet engine of Figure 1 is illustrated as having a single flame tube encompassing a single annular combustion chamber, it is to be understood that a plurality of flame tubes, arranged concentrically around the shaft, may be utilized.

The temperature control means shown in Figure 1 comprises a thermocouple 29 which has its hot junction located at the surface of flame tube 12. The thermocouple is preferably affixed to the upstream end portion of the flame tube, for it is in this part of the flame tube that the highest temperatures are encountered. The thermocouple is connected through leads 31 and 32 to the input terminals of direct current amplifiers 33. The amplified signal from amplifier 33 passes through resistor 37 to two leads 38 and 39. Leads 38 and 39 are connected to servo mechanism 41 which is operatively connected to valve 42 in line 27. Direct voltage to servo mechanism 41 in opposition to the voltage produced by amplifier 32 is provided by a battery or other direct current source 43 and a resistor 44.

Referring to Figure 2 of the drawing, which illustrates a prevaporizer type combustion chamber, identical numerals have been utilized to indicate elements corresponding to those described in conjunction with Figure 1. Instead of nozzles as in Figure 1, at least one cane-type fuel vaporizer tube 46 is disposed within flame tube 12 in order to provide fuel introduction means. Fuel line 21 and oxygen line 27 communicate with each vaporizer tube 46 at one of its ends, the other end of the tube being open to the combustion chamber. Air is passed into the open end of the vaporizer tubes around the fuel and oxygen lines. It is also within the contemplation of the invention to provide spraying means such as nozzles 25 of Figure 1 in order to introduce oxygen into the combustion chamber in addition to that introduced thereinto through vaporizer tubes 46. Furthermore, it is to be understood that the temperature control system of Figure 1 may be used in conjunction with the turbojet engine of Figure 2.

In the operation of the turbojet engine of Figure 1, fuel injected into the combustion chamber through nozzles 19 in an amount dependent upon the setting of throttle valve 23 is ignited by spark producing means, not shown, and burns with air entering the combustion chamber through primary air holes 17. Additional fuel is thereafter ignited by the flame of the burning fuel, by the heat from hot combustion gases, or by contact with the hot walls of the flame tube. The air and combustion gases within the combustion chamber are heated by the heat of combustion and are exhausted therefrom through turbine 13 and rearwardly extending nozzle 14 at an exit velocity higher than the flying speed of the engine. The expansion of the gases through turbine 13 results in the rotation of turbine 13 and compressor 16 which is operatively connected to the turbine by shaft 15. Through the operation of compressor 16, air which enters the engine through its inlet end is jammed into the combustion chamber through primary air holes 17. Additional air is introduced into the downstream portion of the combustion chamber through quench air holes 18 in order to cool the hot combustion gases therein and thereby protect the blades of the turbine from excessively high temperatures.

During the operation of the turbojet engine as described above, it has been found that carbonaceous materials are deposited in the combustion chamber upon combustion of the fuel. Such formations are especially pronounced when utilizing a fuel of high carbon deposition tendency. The carbon lay-down is most evident on the surfaces of the upstream portion of the flame tube and around the fuel nozzles where rich fuel-air mixtures are to be found. In accordance with this invention, an oxygen-containing gas in addition to that required for combustion of the fuel is supplied to the combustion chamber so as to provide an oxygen enriched gaseous mixture in the region where carbon deposits are heaviest. As shown in Figure 1, oxygen from source 26 is supplied to the upstream end portion of the combustion chamber by opening valve 28. The oxygen which is sprayed into the combustion chamber through nozzles 25 contacts and oxidizes the carbon, the resulting combustion products leaving the combustion chamber through exhaust nozzle 14. The injection of the oxygen into the combustion chamber is carried out at the same time fuel is being introduced into that chamber in order that sufficient heat may be available to support the oxidation of the carbon. By introducing the oxygen through nozzles in the manner indicated, the gas is directed over a wide area of the combustion chamber, thereby contacting those portions of the combustion chamber where the accumulation of carbon tends to be the greatest.

While the invention has been described in conjunction with the use of oxygen as the oxygen-containing gas, it is to be understood that other gases may be utilized, the only requirement being that the gas used contain the necessary oxygen for oxidation of the carbon. It is, therefore, within the scope of the invention to use air which may be obtained by diversion of some of the combustion air from its usual air inlets into the combustion chamber. Or still again, vitiated air which may be passed from the exhaust section of the engine to the upstream end of the combustion chamber may be utilized as the oxygen-containing gas stream.

The oxygen-containing gas stream is supplied periodically to the combustion chamber for very short periods of time, the duration of injection being dependent upon several factors. Accordingly, the length of the period and the amount of gas introduced will depend upon the particular jet fuel used, the frequency of addition of the oxygen-containing gas, and the severity of the deposition of carbonaceous materials. While in general the injection period will be in the range of between 0.5 and 2 minutes, experimental tests may be made to determine such period individually for each combination of fuel and power plant.

The addition of the oxygen-containing gas may generally be made during any regime of operation depending somewhat upon the concentration of oxygen in the oxygen-containing gas. When utilizing oxygen as described in relation to Figure 1, the oxygen is preferably introduced only during operating conditions involving a rich fuel-air ratio in order that the fuel-air mixture may not become so lean as to result in "blow-out." When introducing oxygen under such conditions the small change in fuel-air ratio has no appreciable effect on engine performance, and combustion stability does not, therefore, become a problem. When employing air, such as that obtained by diversion of combustion air, as the oxygen-containing gas, introduction into the combustion chamber may be made ordinarily during any regime of operation without danger from lean "blow-out."

The injection of the oxygen-containing gas and the resulting oxidation of the carbon results in the temperature level of the combustion chamber being raised to above that existing prior to such introduction. In accordance with a preferred modification of the present invention, temperature control means are provided to ensure that the temperature level is not increased by such an amount that failure of the flame tube may occur. Referring to Figure 1, thermocouple 29 produces a signal which is proportional to the temperature of the surface of flame tube 12. The signal so produced is amplified by direct current amplifier 33 and passes through resistor 37 to leads 38 and 39 which are connected to servo mechanism 41. The servo mechanism regulates valve 42 in oxygen supply line 27. Direct voltage is applied to servo mechanism 41 by a battery 43 in opposition to the voltage produced by amplifier 33. During normal operation, the voltage produced by battery 43 causes servo mechanism 41 to maintain valve 42 in open position. When the temperature of the walls of the combustion chamber becomes greater than a predetermined magnitude, the voltage produced by amplifier 33 is sufficient to overcome the voltage produced by battery 43, thereby causing servo mechanism 41 to partially close valve 42. As a result, the supply of oxygen to the combustion chamber is decreased, and the temperature of the walls of the combustion chamber is concomitantly lowered. The maximum temperature which can be tolerated before failure of the flame tube results is dependent upon the material of the flame tube, but in general with the present metals available the temperature control system should be adjusted so as to maintain the surface of the flame tube at a temperature below about 1000 to 1500° F. It is also within the scope of the invention to correlate the flow of oxygen with the flow of fuel or combustion air supplied to the combustion chamber so that substantially the same temperature level is maintained within the combustion chamber as existed prior to introduction of the oxygen.

In another preferred modification of the invention, an oxygen-containing gas is supplied to a jet engine utilizing a prevaporizer type combustion chamber in order to effect removal of carbonaceous materials. As illustrated in Figure 2, supplementary oxygen is added through line 27 to the air and fuel supplied to vaporizer tubes 46. The oxygen so supplied to the tubes oxidizes the carbon formed on the inner surface of the tubes, the resulting combustion products thereafter passing through the tubes into the combustion chamber with the vaporized fuel-air mixture. By supplying oxygen to vaporizer tubes 46 in excess of that required for removal of carbon on the inner surfaces of the tubes, oxygen may also be supplied to the combustion chamber proper. The oxygen so passed into the combustion chamber through the vaporizer tubes contacts the carbonaceous materials deposited on the surfaces of the flame tube and on the outside of the vaporizer tubes, thereby oxidizing the carbon. Spraying means similar to nozzles 25 of Figure 1 may also be utilized to supply additional oxygen to the combustion chamber in order to effect removal of carbon deposited on the walls of the flame tube and the outside of the vaporizer tube.

Jet engines may generally be operated by injecting a hydrocarbon fuel and air into the combustion zone at a fuel-air ratio between 0.005 and 0.10 and igniting the fuel so as to heat the air and combustion gases, thus increasing the volume of the gas mass which is exhausted through the exhaust zone of the jet engine. Turbojet engines are preferably operated on an overall fuel-air ratio between 0.01 and 0.03. Ram jet and pulse jet engines are preferably operated on a fuel-air ratio between 0.03 and 0.07. Air is supplied to such jet engines at a combustor inlet air pressure of between 0.2 and 40 atmospheres at a Mach number ranging between 0.01 and 1.0. "Mach number," in this instance, can be defined as the ratio of the velocity of a gas to the local velocity of sound in the gas. Fuel is supplied to the combustion zone of such jet engines at a temperature ranging between −60° F. and 240° F. Air to the combustion zone is preferably supplied at a temperature between −30° F. and 1040° F. The exact fuel-air ratio which is utilized is dependent upon engine design limitations, such as turbine durability and the like. Fuel injection temperatures are dependent upon fuel characteristics such as freezing point and volatility characteristics as well as upon injection nozzle characteristics.

A more comprehensive understanding of the invention may be obtained by reference to the following example which is not intended, however, to be unduly limitative of the invention.

A turbojet engine similar to that illustrated in Figure 1 is operated at a fuel-air ratio of about 0.02. A cat-cracked cycle stock hydrocarbon fuel in the gas-oil boiling range is supplied to the combustion chamber at an inlet temperature of about 70° F. Air is supplied to the combustion chamber at an inlet pressure of about 5 atmospheres at a Mach number of about 0.10 and at an inlet temperature of about 200° F. The hydrocarbon fuel and air are burned within the combustion chamber forming combustion gases which are thereafter expanded through the turbine section to provide power for the compressor. The gases are then further expanded through the rearwardly extending exhaust nozzle at a velocity greater than that of the flying speed of the engine. Under these conditions of operation, the temperature within the combustion chamber is about 1500° F. The combustion of the fuel results in the formation of carbon in the combustion chamber especially at the upstream end of that chamber. After a period of about one hour's operation, the carbon laydown in the combustion chamber has reached such proportions that its removal is desirable. Accordingly, the master valve in the oxygen line to the combustion chamber is opened, allowing oxygen to enter the upstream end of that chamber. After a period of about one minute, the carbon in the combustion chamber is substantially oxidized, the resulting combustion products being removed through the exhaust nozzle. The master valve is then returned to its closed position. During the period of carbon removal, the amount of oxygen introduced into the combustion chamber is regulated so that the temperature of the walls of the combustion chamber does not exceed 1300° F.

While the present invention has been specifically described in conjunction with a turbojet engine, it is to be understood that the invention is applicable to turboprop, pulse jet and ramjet engines as well. The invention is also applicable to the operation of stationary compressor-turbine power generating systems in which a fuel oil is burned in a combustion chamber to supply hot gas for driving a turbine.

It will be apparent that I have achieved the objects of my invention in that I have provided a means and method for removing carbon deposits which tend to accumulate in the combustion chambers of jet engines. By operating in the described manner, it is possible to utilize fuels of high carbon deposition tendency, and resort to the more expensive clean burning fuels is unnecessary in order to overcome the problem of carbon deposition.

As will be evident to those skilled in the art various modifications of this invention may be made or followed in the light of the foregoing disclosure and description without departing from the spirit or scope of the disclosure.

I claim:

In a jet engine having at least one combustion chamber of fixed size the improvement of a fuel control system which comprises, in combination, a fuel tank; a first conduit connecting said fuel tank to said combustion chamber; a source of oxygen-containing gas; a second conduit connecting said source of oxygen-containing gas to said combustion chamber; a first flow control means in said first conduit; a second flow control means in said second conduit; a thermocouple positioned adjacent the walls of said combustion chamber; means for amplifying the output signal of said thermocouple; a servo mechanism; means for feeding said amplified signal to said servo mechanism; a source of direct current; means connecting said source of direct current to said servo mechanism so that direct voltage produced by said source is applied to said servo mechanism in opposition to the voltage produced by said amplifying means; and a third flow control means in said second conduit, said means operatively connected to said servo mechanism.

References Cited in the file of this patent

UNITED STATES PATENTS

| | | |
|---|---|---|
| 1,415,780 | Bowen | May 9, 1922 |
| 1,485,497 | Emerson | Mar. 4, 1924 |
| 2,616,252 | Robinson et al. | Nov. 4, 1952 |
| 2,651,173 | Thwaites et al. | Sept. 8, 1953 |
| 2,668,416 | Lee | Feb. 9, 1954 |
| 2,689,452 | Jordan | Sept. 21, 1954 |
| 2,741,090 | Johnson | Apr. 10, 1956 |
| 2,742,762 | Kuhring | Apr. 24, 1956 |
| 2,827,761 | Schirmer et al. | Mar. 25, 1958 |

FOREIGN PATENTS

| | | |
|---|---|---|
| 107,747 | Great Britain | July 12, 1917 |